US012576873B2

(12) United States Patent
Rosman et al.

(10) Patent No.: US 12,576,873 B2
(45) Date of Patent: Mar. 17, 2026

(54) SYSTEM AND METHOD OF CAPTIONS FOR TRIGGERS

(71) Applicant: TOYOTA RESEARCH INSTITUTE, INC., Los Altos, CA (US)

(72) Inventors: Guy Rosman, Newton, MA (US); Yen-Ling Kuo, Cambridge, MA (US); Stephen G. Mcgill, Broomall, PA (US); Simon A.I. Stent, London (GB)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 326 days.

(21) Appl. No.: 18/324,644

(22) Filed: May 26, 2023

(65) Prior Publication Data

US 2024/0391485 A1 Nov. 28, 2024

(51) Int. Cl.
| | |
|---|---|
| B60W 60/00 | (2020.01) |
| B60W 50/06 | (2006.01) |
| G05B 13/02 | (2006.01) |
| G07C 5/08 | (2006.01) |

(52) U.S. Cl.
CPC ............ B60W 60/00 (2020.02); B60W 50/06 (2013.01); G05B 13/027 (2013.01); G07C 5/085 (2013.01)

(58) Field of Classification Search
CPC .... B60W 60/00; B60W 50/06; B60W 60/001; G05B 13/027; G07C 5/085
See application file for complete search history.

(56) References Cited

U.S. PATENT DOCUMENTS

| | | | |
|---|---|---|---|
| 11,210,836 B2 * | 12/2021 | Amer | ...................... G06T 7/251 |
| 11,776,578 B2 | 10/2023 | Morton et al. | |
| 11,829,150 B2 * | 11/2023 | Gaidon | ................... G06F 18/22 |
| 2020/0134379 A1 * | 4/2020 | Gaidon | ............... G06F 18/2155 |
| 2021/0103745 A1 | 4/2021 | Chakravarty et al. | |
| 2024/0124004 A1 * | 4/2024 | Donderici | ............. B60W 50/06 |

FOREIGN PATENT DOCUMENTS

| | | |
|---|---|---|
| CN | 109242090 A | 1/2019 |
| CN | 112925912 A | 6/2021 |
| JP | 2010066964 A | 3/2010 |
| WO | 2016081880 A1 | 5/2016 |

OTHER PUBLICATIONS

Segal et al, Universal Embeddings for Spatio-Temporal Tagging of Self-Driving Logs, arXiv:2011.06165v1 (Year: 2020).*

(Continued)

*Primary Examiner* — Xiao Liu
(74) *Attorney, Agent, or Firm* — SEYFARTH SHAW LLP

(57) ABSTRACT

A method for triggering capture of diverse driving data from captions is described. The method includes training a discriminator network to identify similarities between a received text description and a received scene description. The method also includes feeding a trained discriminator network with real scene information along with text/sentence descriptions to verify whether the real scene information matches the text/sentence description. The method further includes generating a dataset of diverse driving scenarios retrieved from a dataset of vehicle driving log data in response to a text/sentence query.

18 Claims, 8 Drawing Sheets

400

Word token 410-1

Word token 410-2

...

410-N

Sentence encoder 402

Per query

Sentence decoding loss 404

Map encoder 420

Trajectory Encoder 430

Scenario encoder 440

Learned Comparison 450

Per scenario

(56) References Cited

OTHER PUBLICATIONS

Alharbi et al (Convolutional Neural Network-Based Discriminator for Outlier Detection, Hindawi Computational Intelligence and Neuroscience vol. 2021, Article ID 8811147, 13 pages) (Year: 2021).*

Kuo et al, Trajectory Prediction with Linguistic Representations, 2022 International Conference on Robotics and Automation (ICRA) (Year: 2022).*

Frolov, Stanislav, et al., "DT2I: Dense Text-to-Image Generation from Region Descriptions," arXiv:2204.02035v1 [cs.CV] Apr. 5, 2022.

Hertzmann, Aaron, et al., "Visual Indeterminacy in GAN Art," NeurIPS 2019.

Katz, Sydney M., et al., "Verification of Image-based Neural Network Controllers Using Generative Models," arXiv:2105.07091v1 [cs.LG] May 14, 2021.

Ma, Tao, et al., "MOC-GAN: Mixing Objects and Captions to Generate Realistic Images," arXiv:2106.03128v1 [cs.CV] Jun. 6, 2021.

Palash, Md Aminul Haque, et al., "Fine-Grained Image Generation from Bangla Text Description using Attentional Generative Adversarial Network," arXiv:2109.11749v1 [cs.CV] Sep. 24, 2021.

Wang, Jingbo, et al., "Scene-aware Generative Network for Human Motion Synthesis," arXiv:2105.14804v1 [cs.CV] May 31, 2021.

Yu, Shoou-l, et al., "Strategies for Searching Video Content with Text Queries or Video Examples," arXiv:1606.05705v1 [cs.IR] Jun. 17, 2016.

Zhang, Zhenxing, et al., "OptGAN: Optimizing and Interpreting the Latent Space of the Conditional Text-to-Image GANS," arXiv:2202.12929v1 [cs.CV] Feb. 25, 2022.

Cho, Jaemin, et al., "Unifying Vision-and-Language Tasks via Text Generation," arXiv:2102.02779v2 [cs.CL] May 23, 2021.

Qiao, Tingting, et al., "MirrorGAN: Learning Text-to-image Generation by Redescription," arXiv:1903.05854v1 [cs.CV] Mar. 14, 2019.

* cited by examiner

Figure 3:
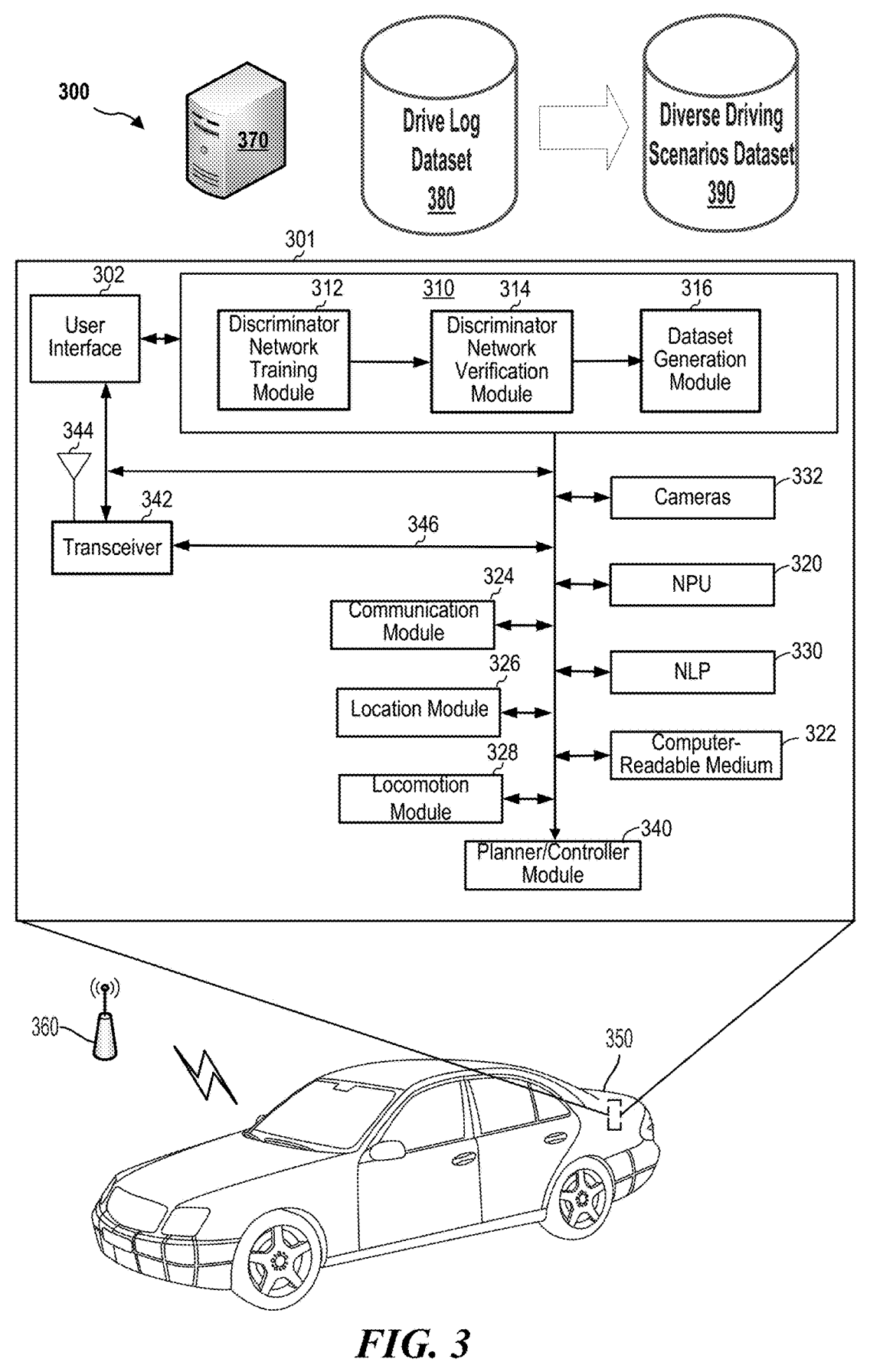

300

370

Drive Log Dataset 380

Diverse Driving Scenarios Dataset 390

301

302

User Interface 312    310    314

Discriminator Network Training Module

Discriminator Network Verification Module

316

Dataset Generation Module

344

342

Transceiver

346

344

332    Cameras

324    Communication Module

320    NPU

326    Location Module

330    NLP

328    Locomotion Module

322    Computer-Readable Medium

340    Planner/Controller Module

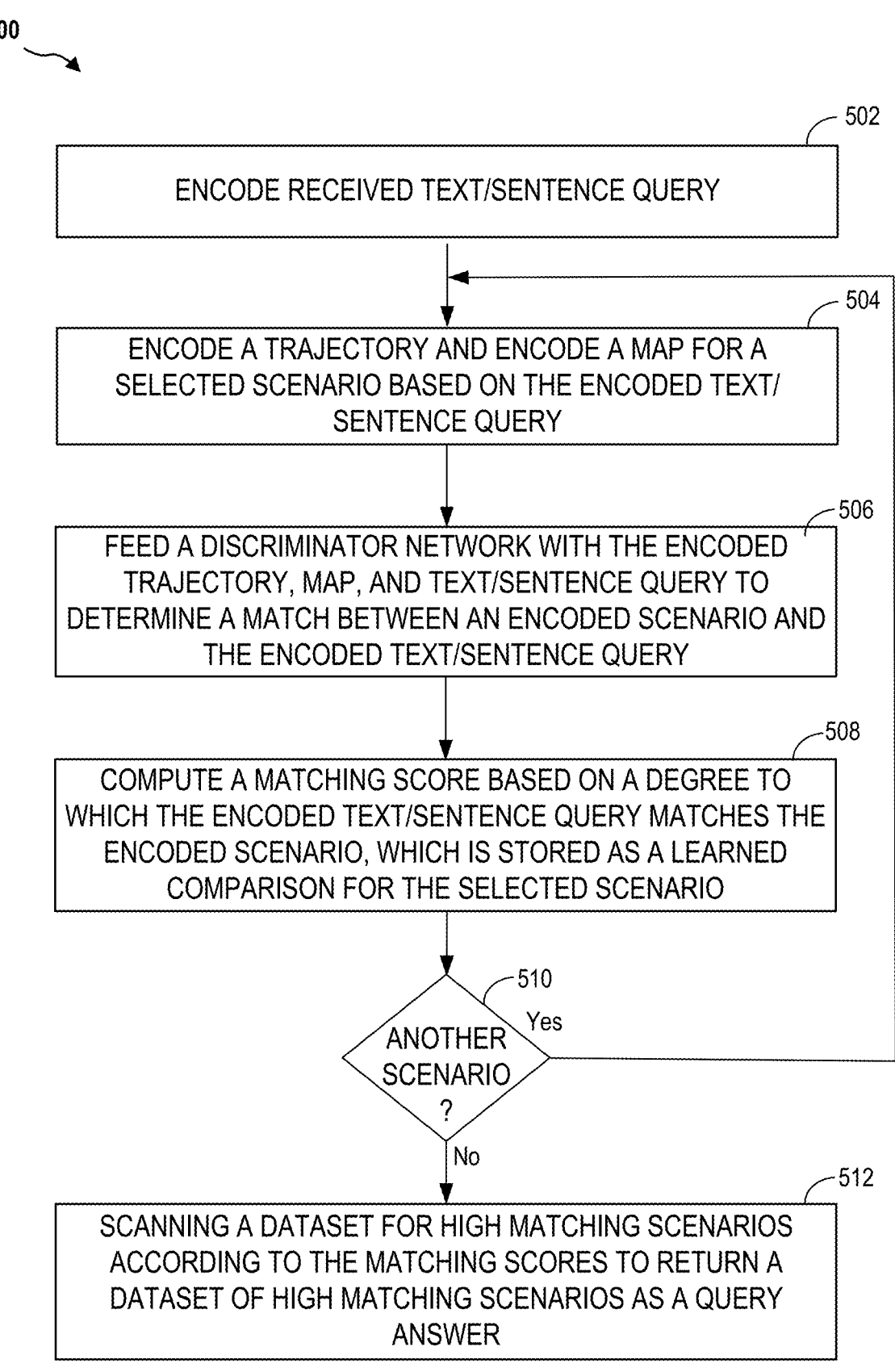

500

502
ENCODE RECEIVED TEXT/SENTENCE QUERY

504
ENCODE A TRAJECTORY AND ENCODE A MAP FOR A SELECTED SCENARIO BASED ON THE ENCODED TEXT/ SENTENCE QUERY

506
FEED A DISCRIMINATOR NETWORK WITH THE ENCODED TRAJECTORY, MAP, AND TEXT/SENTENCE QUERY TO DETERMINE A MATCH BETWEEN AN ENCODED SCENARIO AND THE ENCODED TEXT/SENTENCE QUERY

508
COMPUTE A MATCHING SCORE BASED ON A DEGREE TO WHICH THE ENCODED TEXT/SENTENCE QUERY MATCHES THE ENCODED SCENARIO, WHICH IS STORED AS A LEARNED COMPARISON FOR THE SELECTED SCENARIO

510
ANOTHER SCENARIO ?
Yes
No

512
SCANNING A DATASET FOR HIGH MATCHING SCENARIOS ACCORDING TO THE MATCHING SCORES TO RETURN A DATASET OF HIGH MATCHING SCENARIOS AS A QUERY ANSWER

*FIG. 5*

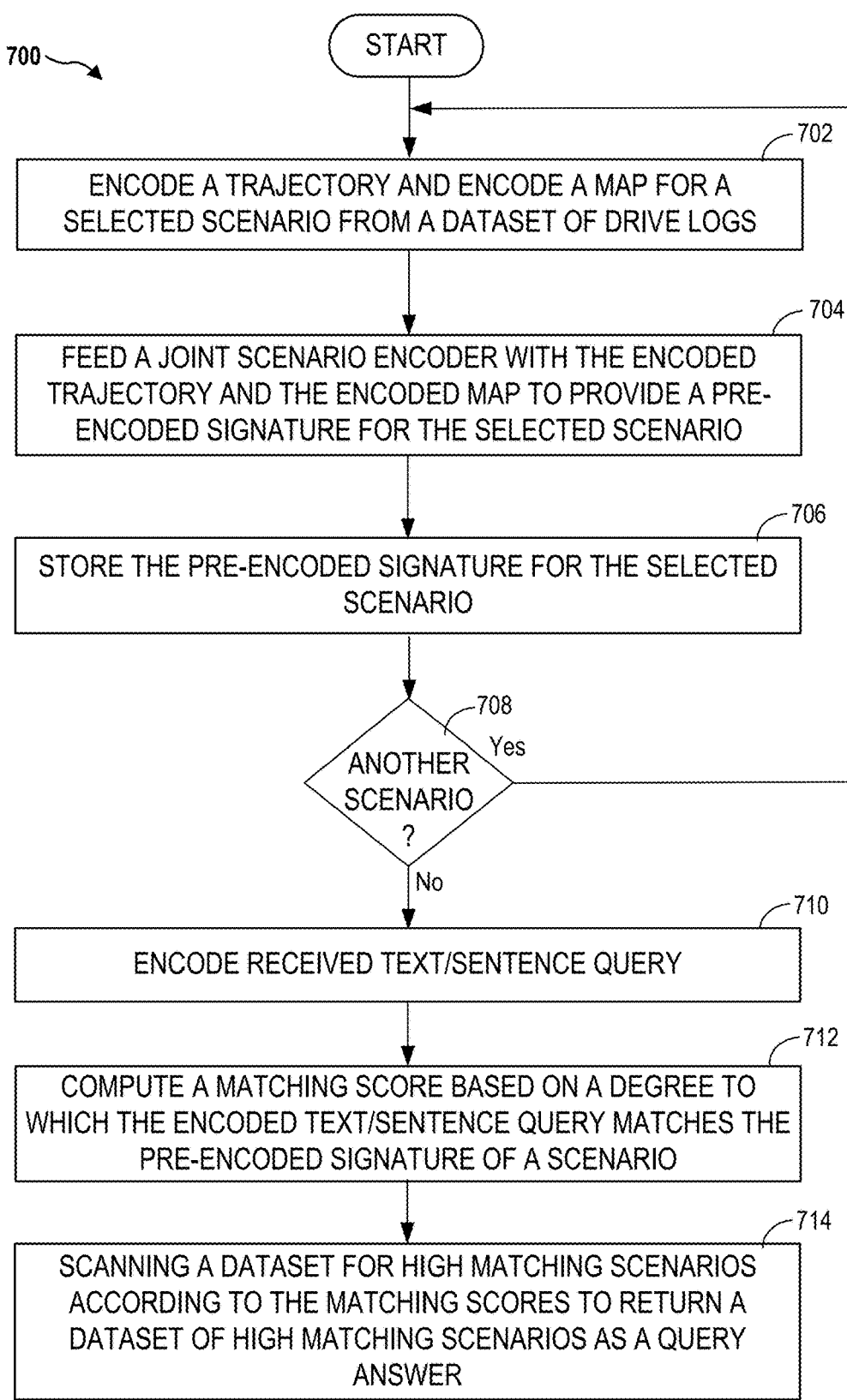

700

START

702

ENCODE A TRAJECTORY AND ENCODE A MAP FOR A SELECTED SCENARIO FROM A DATASET OF DRIVE LOGS

704

FEED A JOINT SCENARIO ENCODER WITH THE ENCODED TRAJECTORY AND THE ENCODED MAP TO PROVIDE A PRE-ENCODED SIGNATURE FOR THE SELECTED SCENARIO

706

STORE THE PRE-ENCODED SIGNATURE FOR THE SELECTED SCENARIO

708

ANOTHER SCENARIO ?

Yes

No

710

ENCODE RECEIVED TEXT/SENTENCE QUERY

712

COMPUTE A MATCHING SCORE BASED ON A DEGREE TO WHICH THE ENCODED TEXT/SENTENCE QUERY MATCHES THE PRE-ENCODED SIGNATURE OF A SCENARIO

714

SCANNING A DATASET FOR HIGH MATCHING SCENARIOS ACCORDING TO THE MATCHING SCORES TO RETURN A DATASET OF HIGH MATCHING SCENARIOS AS A QUERY ANSWER

*FIG. 7*

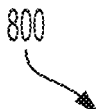

800

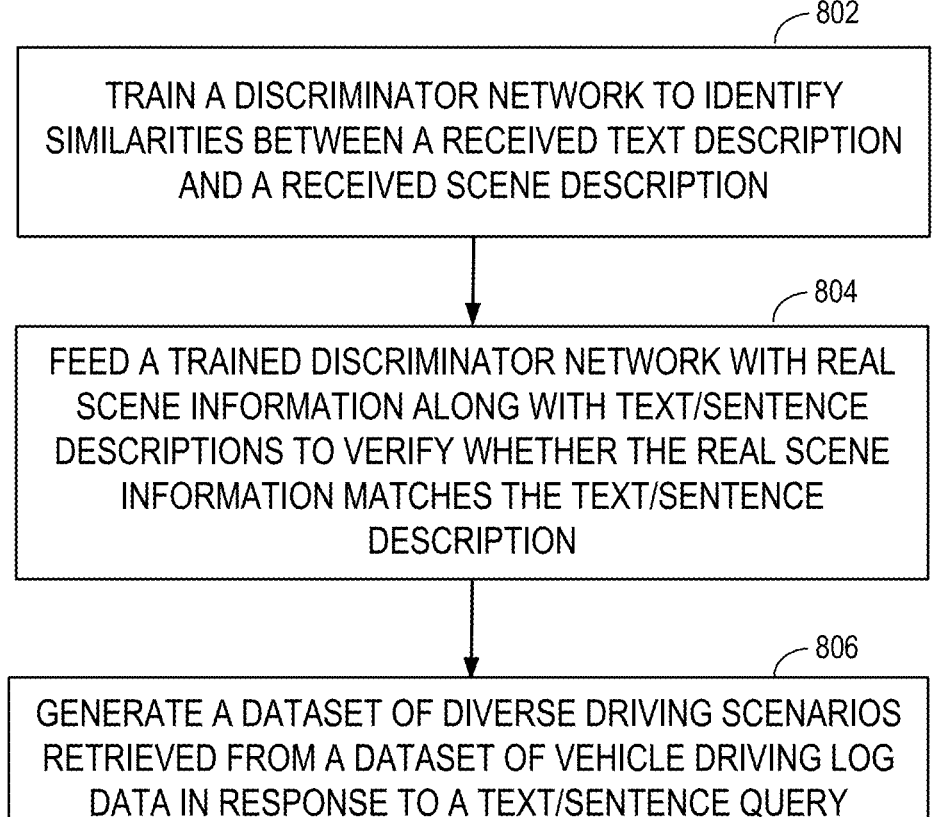

802

TRAIN A DISCRIMINATOR NETWORK TO IDENTIFY
SIMILARITIES BETWEEN A RECEIVED TEXT DESCRIPTION
AND A RECEIVED SCENE DESCRIPTION

804

FEED A TRAINED DISCRIMINATOR NETWORK WITH REAL
SCENE INFORMATION ALONG WITH TEXT/SENTENCE
DESCRIPTIONS TO VERIFY WHETHER THE REAL SCENE
INFORMATION MATCHES THE TEXT/SENTENCE
DESCRIPTION

806

GENERATE A DATASET OF DIVERSE DRIVING SCENARIOS
RETRIEVED FROM A DATASET OF VEHICLE DRIVING LOG
DATA IN RESPONSE TO A TEXT/SENTENCE QUERY

*FIG. 8*

SYSTEM AND METHOD OF CAPTIONS FOR TRIGGERS

BACKGROUND

Field

Certain aspects of the present disclosure generally relate to machine learning and, more particularly, to a system of captions for triggers.

Background

Autonomous agents, such as self-driving cars and robots, are quickly evolving. Self-driving cars rely on various ways of perceiving an environment. Unfortunately, the various ways used by self-driving cars to perceive a surrounding environment are not entirely reliable. In addition, because self-driving cars have to interact with other vehicles, many critical concerns arise. For example, one critical concern is how to design vehicle control of an autonomous vehicle using machine learning.

Unfortunately, vehicle control by machine learning may be ineffective in situations involving complex interactions between vehicles (e.g., a situation where an ego vehicle merges into a traffic lane. Machine learning techniques for vehicle control by selecting an appropriate vehicle control action of an ego vehicle are desired. For example, a selected speed/acceleration/steering angle of the ego vehicle may be applied as a vehicle control action. An autonomous test vehicle may operate according to selected vehicle control actions. During operation, an autonomous vehicle generates a vehicle log of data captured during autonomous operation of the ego vehicle.

Current technology requires indexing specific scenario properties with filters, and then devising text representations for queries like the structure query language (SQL) to generate training data from the generated vehicle log. A system and method that uses text/sentence descriptions to match scenarios and scene rollouts from the vehicle log is desired.

SUMMARY

A method for triggering capture of diverse driving data from captions is described. The method includes training a discriminator network to identify similarities between a received text description and a received scene description. The method also includes feeding a trained discriminator network with real scene information along with text/sentence descriptions to verify whether the real scene information matches the text/sentence description. The method further includes generating a dataset of diverse driving scenarios retrieved from a dataset of vehicle driving log data in response to a text/sentence query.

A non-transitory computer-readable medium having program code recorded thereon for triggering capture of diverse driving data from captions is described. The program code is executed by a processor. The non-transitory computer-readable medium includes program code to train a discriminator network to identify similarities between a received text description and a received scene description. The non-transitory computer-readable medium also includes program code to feed a trained discriminator network with real scene information along with text/sentence descriptions to verify whether the real scene information matches the text/sentence description. The non-transitory computer-readable medium further includes program code to generate a dataset of diverse driving scenarios retrieved from a dataset of vehicle driving log data in response to a text/sentence query.

A system for triggering capture of diverse driving data from captions is described. The system includes a discriminator network training module to train a discriminator network to identify similarities between a received text description and a received scene description. The system also includes a discriminator network verification module to feed a trained discriminator network with real scene information along with text/sentence descriptions to verify whether the real scene information matches the text/sentence description. The system further includes a dataset generation module to generate a dataset of diverse driving scenarios retrieved from a dataset of vehicle driving log data in response to a text/sentence query.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 3 is a diagram illustrating a hardware implementation for a caption triggering system, according to aspects of the present disclosure.

FIG. 5 is a flowchart illustrating a method for triggering capture a dataset of diverse driving scenario data from captions in a dataset of drive log data, according to aspects of the present disclosure.

FIG. 7 is a flowchart illustrating a method for triggering capture of a dataset of diverse driving scenario data from captions in a dataset of drive log data, according to further aspects of the present disclosure.

FIG. 8 is a process flow diagram illustrating a method for triggering capture of a dataset of diverse driving scenario data from captions in a dataset of drive log data, according to aspects of the present disclosure.

DETAILED DESCRIPTION

Figure 1:
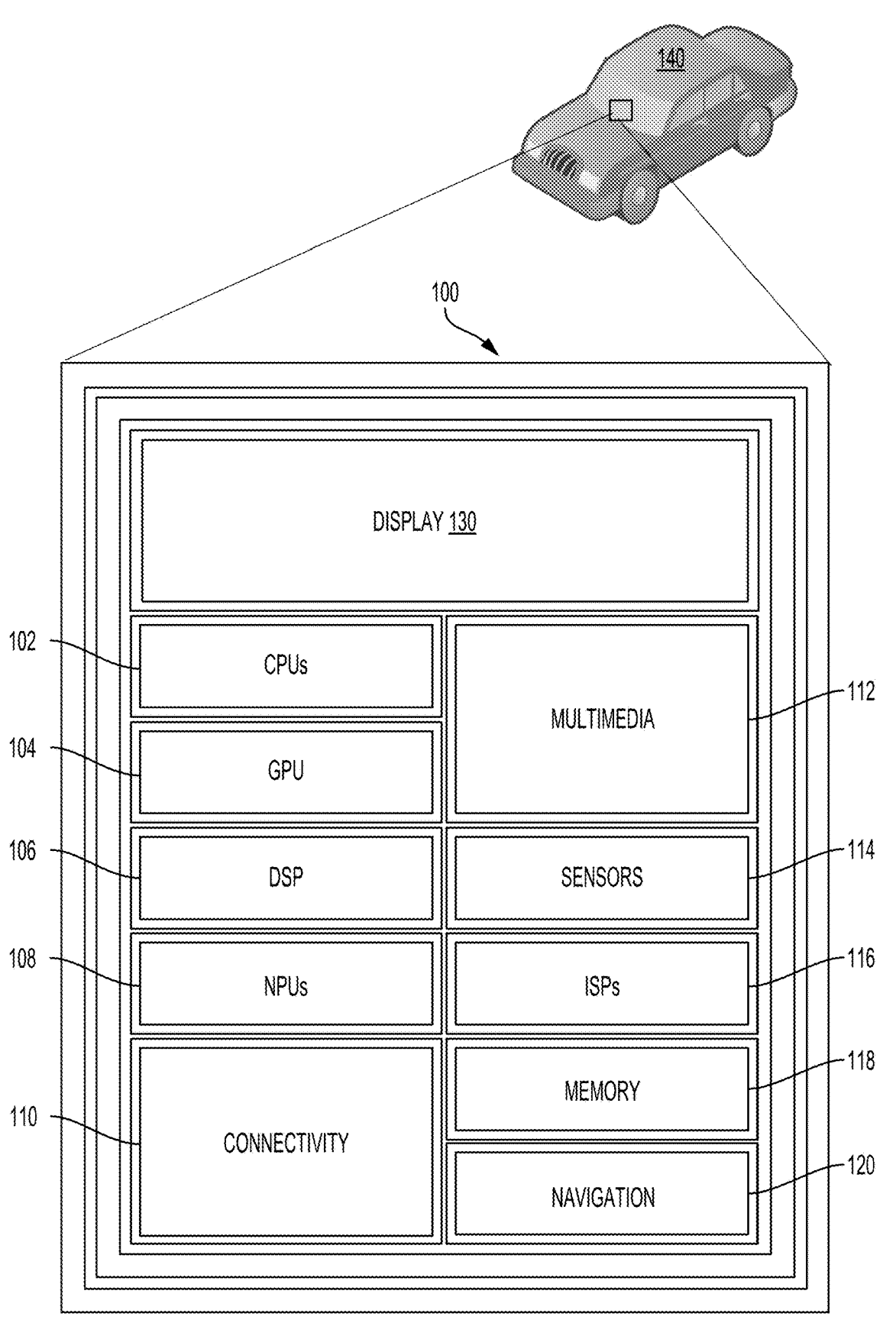
FIG. 1 illustrates an example implementation of designing a neural network using a system-on-a-chip (SOC) for a caption trigger system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented, or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Automation of vehicle control on highways is rapidly advancing. These automated vehicles are expected to reduce traffic accidents and improve traffic efficiency. In particular, machine learning techniques for vehicle control by selecting an appropriate vehicle control action of an ego vehicle are desired. For example, a selected speed/acceleration/steering angle of the ego vehicle may be applied as a vehicle control action. Unfortunately, vehicle control by machine learning may be ineffective in situations involving complex interactions between vehicles (e.g., a situation where a controlled (ego) vehicle merges into a traffic lane). In particular, safety is a critical concern when building autonomous agents that operate in human environments. For autonomous driving in particular, safety is a formidable challenge due to high speeds, rich environments, and complex dynamic interactions with many traffic participants, including vulnerable road users.

Training machine learning techniques for vehicle control by selecting an appropriate vehicle control action of an ego vehicle involves significant training data. For example, an autonomous vehicle may operate according to selected vehicle control actions and generate a vehicle log of data captured during autonomous operation of the ego vehicle. Current technology involves indexing specific scenario properties with filters and then devising text representations for queries like the structure query language (SQL) to generate training data from the generated vehicle log. A system and method that uses text/sentence descriptions to match scenarios and scene rollouts from datasets of vehicle logs is desired.

Some aspects of the present disclosure are directed to an improvement over the prior art in which a system learns scenario representations automatically from text. Some aspects of the present disclosure use text/sentence descriptions to match scenarios and scene rollouts from driving data in datasets of vehicle log data. In some aspects of the present disclosure, the system relies on a discriminator network of a generative adversarial network (GAN) trained on text and scene descriptions for matching a vehicle log to a text/sentence description and using a trained discriminator network to search similarities between the text/sentence description and scene descriptions.

In some aspects of the present disclosure, a discriminator network is trained to accept a text description and a scene description (e.g., trajectories, map information, agent location, etc.) for identifying similarities. A trained discriminator network is then fed real scene information along with a text/sentence description to determine whether the pairing between the text/sentence description and the scene description is real according to a learned comparison. In this example, a discriminator network is gradually trained to accurately predict scenario representations or scene rollouts from text/sentence input queries to generate a dataset of high-matching scenarios. In some aspects of the present disclosure, once trained, the trained discriminator network is run on a dataset of vehicle driving log data to determine whether a vehicle log of the dataset of vehicle driving log data matches a provided text/sentence description based on the learned comparison.

In some aspects of the present disclosure, a more efficient method for triggering capture of a dataset of diverse driving scenario data from captions includes constructing the scene and log representation so that they are pre-encoded once and then stored. In this aspect of the present disclosure, the pre-encoding provides a unique signature (e.g, an encoded scenario signature) of each scene to be contrasted with any possible sentence in a relatively efficient neural encoding that involves the encoded sentence and the signature. These aspects of the present disclosure provide the ability to automatically learn scenario representations from text and perform retrieval of diverse scenarios via a text query by searching data (e.g., images, map information, agent location, etc.) involving a scenario description using text/sentences with increased accuracy. In particular, the discriminator network searches or estimates similarities in data to a text/sentence associated with a scenario for generating a dataset. For example, the system uses the dataset for system testing by collecting vehicle driving data which is matched to a text/sentence associated with a scenario for generating the dataset.

FIG. 1 illustrates an example implementation of the aforementioned system and method for triggering capture of a dataset of diverse driving scenario data from captions in a dataset of drive log data captured by an autonomous vehicle 140 using a system-on-a-chip (SOC) 100, according to aspects of the present disclosure. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include sixth generation (6G) connectivity, fifth generation (5G) new radio (NR), connectivity, fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, select a control action, according to the display 130 illustrating a view of the autonomous vehicle 140.

In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system. The SOC 100 may be based on an Advanced Risk Machine (ARM) instruction set or the like. In another aspect of the present disclosure, the SOC 100 may be a server computer in communication with the autonomous vehicle 140. In this arrangement, the autonomous vehicle 140 may include a processor and other features of the SOC 100.

In this aspect of the present disclosure, instructions loaded into a processor (e.g., CPU 102) or the NPU 108 of the autonomous vehicle 140 may include code to trigger capture of a dataset of diverse driving scenario data from captions in a dataset of vehicle driving log data. The instructions loaded into a processor (e.g., CPU 102) may also include code to train a discriminator network to identify similarities between a received text description and a received scene description. The instructions loaded into a processor (e.g., CPU 102) may also include code to feed a trained discriminator network with real scene information along with text/sentence descriptions to verify whether the real scene information matches the text/sentence description. For example, the instructions loaded into a processor (e.g., CPU 102) may also include code to run the trained discriminator network on a dataset of vehicle driving log data to determine whether driving data from the dataset of vehicle driving log data matches a provided text/sentence description. The instructions loaded into a processor (e.g., CPU 102) may also include code to generate a dataset of diverse scenarios retrieved from a dataset of vehicle log data in response to a text/sentence query.

Figure 2:
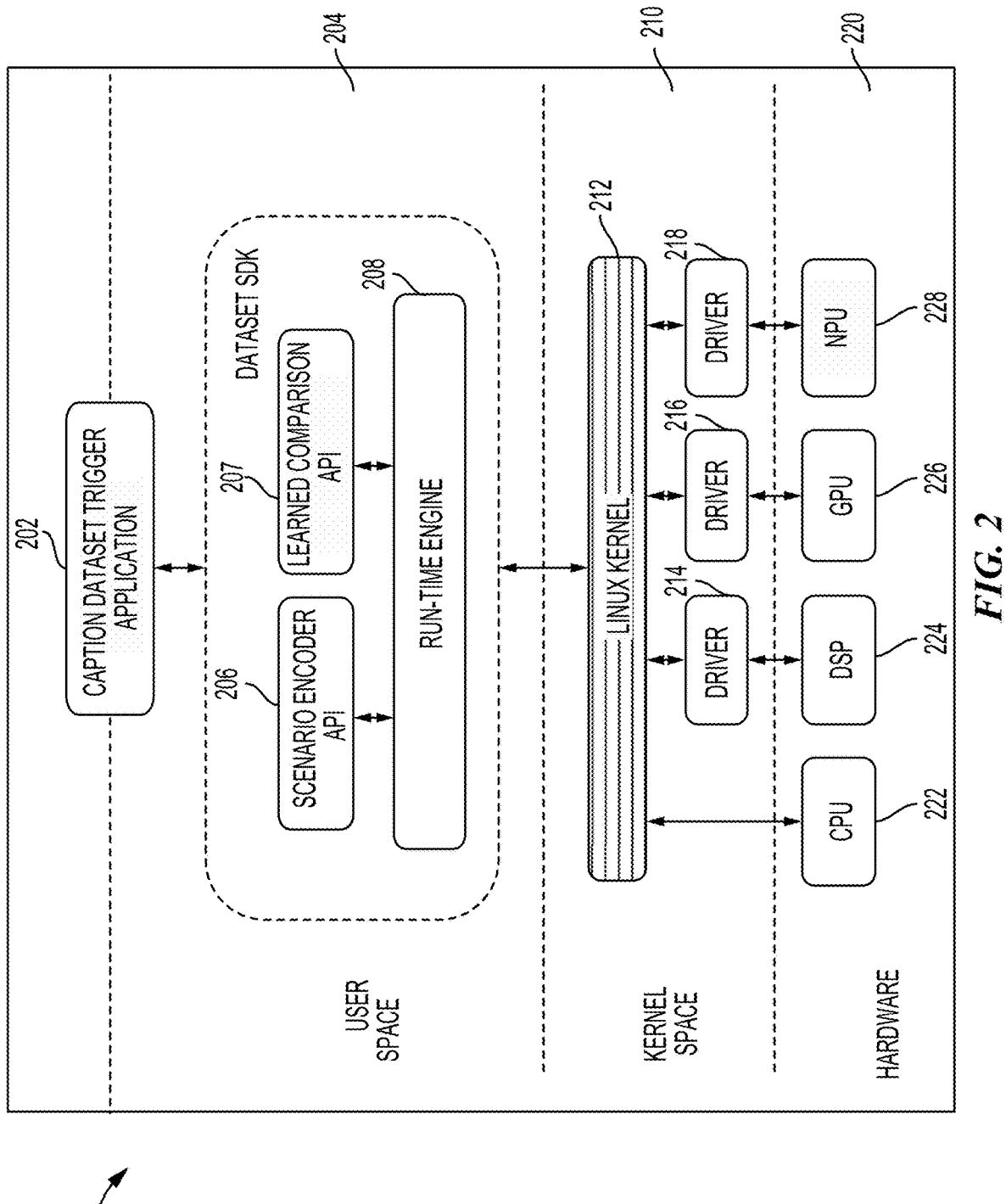
FIG. 2 is a block diagram illustrating an exemplary software architecture that may modularize artificial intelligence (AI) functions for providing captions for triggers, according to aspects of the present disclosure.

FIG. 2 is a block diagram illustrating a software architecture 200 that may modularize artificial intelligence (AI) functions for triggering capture of a dataset of diverse driving scenario data from captions in a dataset generation system, according to aspects of the present disclosure. Using the architecture, a caption dataset trigger application 202 may be designed such that it may cause various processing blocks of an SOC 220 (for example a CPU 222, a DSP 224, a GPU 226, and/or an NPU 228) to perform supporting computations during run-time operation of the caption dataset trigger application 202. FIG. 2 describes the software architecture 200 for triggering capture of a dataset of diverse driving scenario data from captions in a dataset generation scheme. It should be recognized that the triggering capture of a dataset of diverse driving scenario data from captions in a dataset of driving logs is not limited to a dataset coding system. According to aspects of the present disclosure, triggering the capture of diverse datasets from caption functionality is applicable to any type of data, such as stored in a database.

The caption dataset trigger application 202 may be configured to call functions defined in a user space 204 that may, for example, provide for dataset generation services in response to caption triggers. The caption dataset trigger application 202 may make a request for compiled program code associated with a library defined in a scenario encoder application programming interface (API) 206. The scenario encoder API 206 is configured to train a discriminator network to identify similarities between a received text description and a received scene description. In response, compiled code of a learned comparison API 207 is configured to generate a dataset of diverse scenarios retrieved from a dataset of vehicle log data in response to a text/sentence query.

A run-time engine 208, which may be compiled code of a run-time framework, may be further accessible to the caption dataset trigger application 202. The caption dataset trigger application 202 may cause the run-time engine 208, for example, to take actions for triggering capture of a dataset of diverse driving scenario data from captions in a dataset generation scheme. In response to detection of matching text/sentence query and driving data, the run-time engine 208 may in turn send a signal to an operating system 210, such as a Linux Kernel 212, running on the SOC 220. FIG. 2 illustrates the Linux Kernel 212 as software architecture for the dataset generation scheme based on received text/sentence queries and matched driving set data. It should be recognized, however, that aspects of the present disclosure are not limited to this exemplary software architecture. For example, other kernels may provide the software architecture to support dataset generation based on the caption trigger functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Training machine learning techniques for vehicle control by selecting an appropriate vehicle control action of an ego vehicle involves significant training data. For example, an autonomous vehicle may operate according to selected vehicle control actions and generate a vehicle log of data captured during autonomous operation of the ego vehicle. Current technology involves indexing specific scenario properties with filters and then devising text representations for queries like the structure query language (SQL) to generate training data from the generated vehicle log. A system and method that uses text/sentence descriptions to match scenarios and scene rollouts from datasets of vehicle logs is desired.

In some aspects of the present disclosure, a discriminator network is trained to accept a text description and a scene description (e.g., trajectories, map information, agent location, etc.) for identifying similarities. A trained discriminator network is then fed real scene information along with a text/sentence description to determine whether the pairing between the text/sentence description and the scene description is real according to a learned comparison. In this example, a discriminator network is gradually trained to accurately predict scenario representations or scene rollouts from text/sentence input queries to generate a dataset of high-matching scenarios. In some aspects of the present disclosure, once trained, the trained discriminator network is run on a dataset of vehicle driving log data to determine whether a vehicle log of the dataset of vehicle driving log data matches a provided text/sentence description based on the learned comparison.

FIG. 3 is a diagram illustrating a hardware implementation for a caption triggering system 300 for generating a dataset of diverse driving scenarios, according to aspects of the present disclosure. The caption triggering system 300 may be configured to train a discriminator network to identify similarities between a received text description and a received scene description. The caption triggering system 300 is configured to feed a trained discriminator network with real scene information along with text/sentence descriptions to verify whether the real scene information matches the text/sentence description. Additionally, the caption triggering system 300 is configured to run the trained discriminator network on a vehicle drive log dataset 380 to determine whether driving data from the vehicle drive log dataset 380 matches a provided text/sentence description. The caption triggering system 300 is further configured to generate a diverse driving scenarios dataset 390 of driving data retrieved from the vehicle drive log dataset 380 of an autonomous vehicle 350 in response to a text/sentence query.

The caption triggering system 300 includes a dataset generation system 301, which may be a component of a vehicle, a robotic device, or other non-autonomous device (e.g., non-autonomous vehicles, ride-share cars, etc.). For example, as shown in FIG. 3, the dataset generation system 301 is a component of the autonomous vehicle 350. Aspects of the present disclosure are not limited to the dataset generation system 301 being a component of the autonomous vehicle 350. Other devices, such as a bus, motorcycle, or other like non-autonomous vehicle, are also contemplated for implementing the dataset generation system 301. In this example, the autonomous vehicle 350 may be autonomous or semi-autonomous; however, other configurations for the autonomous vehicle 350 are contemplated.

The caption triggering system 300 may be a component of a dataset generation server 370 or user device. The user device may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a Smartbook, an Ultrabook, a medical device or equipment, biometric sensors/devices, wearable devices (e.g., smart watches, smart clothing, smart glasses, smart wrist bands, smart jewelry (e.g., smart ring, smart bracelet)), an entertainment device (e.g., a music or video device, or a satellite radio), a global positioning system device, or any other suitable device that is configured to communicate via a wireless or wired medium.

The dataset generation system 301 may be implemented with an interconnected architecture, represented generally by an interconnect 346. The interconnect 346 may include any number of point-to-point interconnects, controller area network (CAN) buses and/or bridges, depending on the specific application of the dataset generation system 301 and the overall design constraints. The interconnect 346 links together various circuits including one or more processors and/or hardware modules, represented by a user interface 302, a dataset trigger capture module 310, a neural network processor (NPU) 320, a computer-readable medium 322, a communication module 324, a location module 326, a locomotion module 328, a natural language processor (NLP) 330, cameras 332, and a planner/controller module 340. The interconnect 346 may also link various other circuits such as timing sources, peripherals, voltage regulators, and power management circuits, which are well known in the art, and, therefore, will not be described any further.

The dataset generation system 301 includes a transceiver 342 coupled to the user interface 302, the dataset trigger capture module 310, the NPU 320, the computer-readable medium 322, the communication module 324, the location module 326, the locomotion module 328, the NLP 330, the cameras 332, and the planner/controller module 340. The transceiver 342 is coupled to an antenna 344. The transceiver 342 communicates with various other devices over a transmission medium. For example, the transceiver 342 may receive commands via transmissions from a user or a connected device. In this example, the transceiver 342 may receive/transmit information for the dataset trigger capture module 310 to/from connected devices within the vicinity of the autonomous vehicle 350.

The dataset generation system 301 includes the NPU 320 coupled to the computer-readable medium 322. The NPU 320 performs processing, including the execution of software stored on the computer-readable medium 322 to provide a neural network model for applying a learned comparison to determine whether the vehicle driving logs of the autonomous vehicle in the vehicle drive log dataset 380 match provided text/sentence description functionality according to the present disclosure. The software, when executed by the NPU 320, causes the dataset generation system 301 to perform the various functions described to generate the diverse driving scenarios dataset 390 retrieved from the vehicle drive log dataset 380 of vehicle driving logs in response to a text/sentence query through the user interface 302, or any of the modules (e.g., 310, 324, 326, 328, and/or 340). The computer-readable medium 322 may also be used for storing data that is manipulated by the NLP 330 when executing the software to analyze driving log data, as captured by a first camera (fixed on the user) and a second camera fixed on the environment of the autonomous vehicle 350.

The location module 326 may determine a location of the autonomous 350. For example, the location module 326 may use a global positioning system (GPS) to determine the location of the autonomous vehicle 350. The location module 326 may implement a dedicated short-range communication (DSRC)-compliant GPS unit. A DSRC-compliant GPS unit includes hardware and software to make the autonomous vehicle 350 and/or the location module 326 compliant with the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 342. For example, the communication module 324 may be configured to provide communication capabilities via different wireless protocols, such as 6G, 5G new radio (NR), Wi-Fi, long term evolution (LTE), 4G, 3G, etc. The communication module 324 may also communicate with other components of the autonomous vehicle 350 that are not modules of the dataset generation system 301. The transceiver 342 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include 3G, 4G, 5G NR, 6G, LTE, LTE-V2X, LTE-D2D, VOLTE, or any other mobile data network or combination of mobile data networks. Further, the network access point 360 may include one or more IEEE 802.11 wireless networks.

The dataset generation system 301 also includes the planner/controller module 340 for planning a route and controlling the locomotion of the autonomous vehicle 350, via the locomotion module 328 for operation of the autonomous 350. In one configuration, the planner/controller module 340 may override a user input when the user input is expected (e.g., predicted) to cause a collision according to an autonomous level of the autonomous vehicle 350. The modules may be software modules running in the NPU 320, resident/stored in the computer-readable medium 322, and/ or hardware modules coupled to the NPU 320, or some combination thereof.

The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher-level number than another autonomous vehicle (e.g., Level 3 is a higher-level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle ("HAV") is an autonomous vehicle that is Level 3 or higher. Accordingly, in some configurations the autonomous vehicle 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The dataset generation system 301 also includes the NLP 330 to receive and analyze content and captions from the vehicle drive log dataset 380. In some aspects of the present disclosure, the dataset generation system 301 may use natural language processing of the NLP 330 to apply the learned comparison to determine whether the vehicle driving logs of the autonomous vehicle 350 in the vehicle drive log dataset 380 match provided text/sentence description queries. The NLP 330 may receive and analyze the labeled captions to detecting driver driving scenarios to populate the diverse driving scenarios dataset 390.

The dataset trigger capture module 310 may be in communication with the user interface 302, the NPU 320, the computer-readable medium 322, the communication module 324, the location module 326, the locomotion module 328, the NLP 330, the planner/controller module 340, and the transceiver 342. In one configuration, the dataset trigger capture module 310 monitors content from the user interface 302 to determine if a text/sentence query is received. The dataset trigger capture module 310 may include driving log data generated by the autonomous vehicle 350 in the vehicle drive log dataset 380. According to aspects of the present disclosure, the NLP 330 may use natural language processing to apply the learned comparison to determine whether the vehicle driving logs of the autonomous vehicle 350 in the vehicle drive log dataset 380 match provided text/sentence description queries from the user interface 302.

As shown in FIG. 3, the dataset trigger capture module 310 includes a discriminator network training module 312, a discriminator network verification module 314, and a dataset generation module 316. The discriminator network training module 312, the discriminator network verification module 314, and the dataset generation module 316 may be components of a same or different artificial neural network, such as a deep convolutional neural network (CNN). The discriminator network training module 312, the discriminator network verification module 314, and the dataset generation module 316 are not limited to a CNN. The discriminator network training module 312 is configured to train a discriminator network to identify similarities between a received text description and a received scene description. In some aspects of the present disclosure, over time, the discriminator network is trained to accurately predict scenario representations from text input according to a learned comparison.

This configuration of the dataset trigger capture module 310 includes the discriminator network verification module 314 to feed a trained discriminator network with real scene information along with text/sentence descriptions to verify whether the real scene information matches the text/sentence description. For example, the discriminator network verification module 314 may run the trained discriminator network on a dataset of vehicle driving log data to determine whether driving data from the dataset of vehicle driving log data matches a provided text/sentence description. Some aspects of the present disclosure construct pre-encoded scene and log representation, which are subsequently stored. This example provides a small signature of each scene for contrasting with any possible text description (e.g., an encoded sentence) in an efficient neural encoding that involves the encoded sentence and the signature.

The dataset trigger capture module 310 also includes the dataset generation module 316 to generate a dataset of diverse scenarios retrieved from a dataset of vehicle log data in response to a text/sentence query. For example, the dataset generation module 316 can search data such as images, map information, agent location, and so on, involving a scenario description from the vehicle drive log dataset 380 using text/sentences with increased accuracy. In particular, the dataset generation module 316 searches or estimates similarities in data to a text/sentence associated with a scenario for generating the diverse driving scenarios dataset 390. In some aspects of the present disclosure, the diverse driving scenarios dataset 390 is generated from driving data that matches a text/sentence associated with a desired scenario. In some aspects of the present disclosure, the dataset generation module 316 may be implemented and/or work in conjunction with the dataset generation server 370.

Various aspects of the present disclosure may be implemented in an agent, such as a vehicle. The vehicle may operate in either an autonomous mode, a semi-autonomous mode, or a manual mode. In some examples, the vehicle may switch between operating modes.

Figure 4:
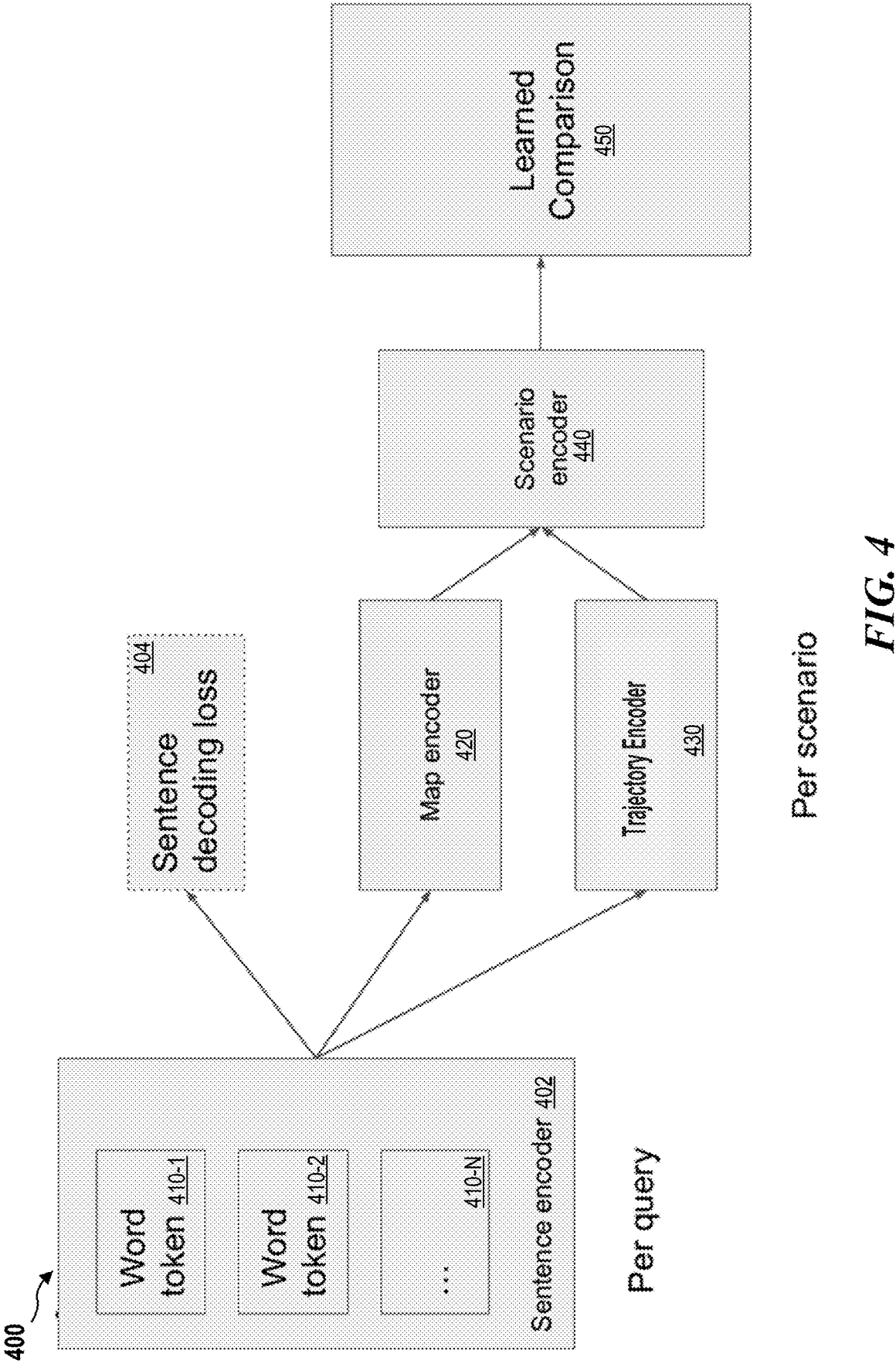
FIG. 4 is a block diagram illustrating a caption triggered dataset generation system, according to aspects of the present disclosure.

FIG. 4 is a block diagram illustrating a caption triggered dataset generation system 400, according to aspects of the present disclosure. In some aspects of the present disclosure, the caption triggered dataset generation system 400 learns scenario representations automatically from text. Some aspects of the present disclosure use text/sentence descriptions to match scenarios and scene rollouts. By contrast, current technology requires indexing specific scenario properties with filters, and then devising text representations for queries like the structure query language (SQL).

As shown in FIG. 4, the caption triggered dataset generation system 400 includes a sentence encoder 402 configured to encode a received text/sentence query into word tokens 410 (410-1, 410-2, . . . , 410-N) as well as a sentence decoding loss 404. The caption triggered dataset generation system 400 further includes a map encoder 420 and a trajectory encoder 430. In some aspects of the present disclosure, the map encoder 420 and the trajectory encoder 430 encode trajectories, map information, agent location, and the like per each driving scenario from, for example, a dataset of drive log data. A joint scenario encoder 440 receives an encoded scenario from the map encoder 420 and the trajectory encoder 430 and determines whether the encoded sentence matches the encoded scenario. In some aspects of the present disclosure, a degree to which the encoded sentence matches the encoded scenario is stored as a matching score by a learned comparison block 450.

In some aspects of the present disclosure, the joint scenario encoder 440 is implemented using a discriminator network. In this configuration a discriminator network of the joint scenario encoder 440 is trained to accept a text description and a scene description (for example, trajectories, map information, agent location, collectively scene and log information) for identifying similarities. Next, the discriminator network of the joint scenario encoder 440 is fed real scene and log information along with a text/sentence description to determine whether the pairing between the text/sentence description and the scene and log description is real. In this example, the discriminator network of the joint scenario encoder 440 is gradually trained to accurately predict scenario representations or scene rollouts from text/sentence query inputs. The caption triggered dataset generation system 400 may engage in a process, for example, as shown in FIG. 5.

FIG. 5 is a flowchart illustrating a method for triggering capture of diverse driving scenario data from captions in a dataset of drive log data, according to aspects of the present disclosure. A method 500 of FIG. 5 begins at block 502, in which a received text/sentence query is encoded. For example, as described in FIG. 4, the sentence encoder 402 encodes the received text/sentence query into the word tokens 410. In this example, the sentence encoder 402 tokenizes and encodes the received text/sentence query using a long short-term memory (LSTM) network or an attention network. For example, the word tokens 410 may be fed to an attention network/LSTM network and may focus on a selected traffic lane. Additionally, an overall representation of the sentence is fed into the attention network/LSTM network.

Referring again to FIG. 5, at block 504, a trajectory and a map for a selected scenario are encoded based on the encoded text/sentence query. For example, as shown in FIG. 4, the caption triggered dataset generation system 400 includes the map encoder 420 and the trajectory encoder 430 to encode scene and log information. In some aspects of the present disclosure, the map encoder 420 and the trajectory encoder 430 encode trajectories, map information, agent location, and the like per each driving scenario from, for example, a dataset of drive log data based on a driving scenario to provide an encoded scenario.

At block 506, a discriminator network is fed with the encoded trajectory, the encoded map of an encoded scenario, and encoded text/sentence query to determine a match between the encoded scenario and the encoded text/sentence query. For example, as shown in FIG. 4, a joint scenario encoder 440 receives an encoded scenario from the map encoder 420 and the trajectory encoder 430 and determines whether the encoded sentence matches the encoded scenario. In this example, the joint scenario encoder 440 is implemented using a discriminator network.

At block 508, a matching score is computed based on the degree to which the encoded text/sentence query matches the encoded scenario, and the matching score is stored as a learned comparison for the selected scenario. For example, as shown in FIG. 4, a degree to which the encoded text/sentence query matches the encoded scenario is stored as a matching score by the learned comparison block 450 for the selected scenario. At block 510, blocks 504 to 508 are repeated for each driving scenario in, for example, a dataset of drive logs. At block 512, the dataset is scanned for high matching scenarios according to the matching scores to return a dataset of the high matching scenarios as a query answer.

Figure 6:
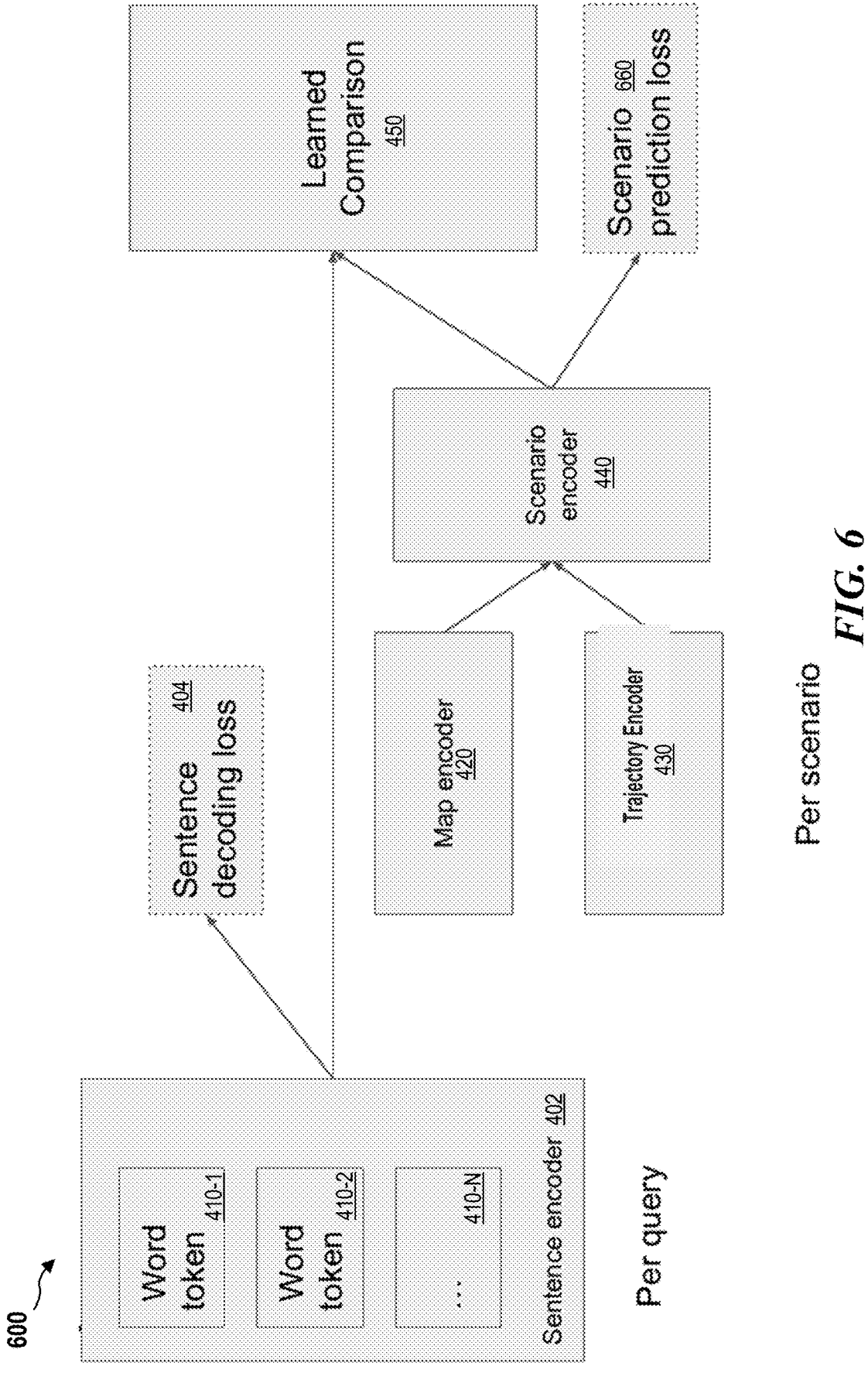
FIG. 6 is a block diagram illustrating a caption triggered dataset generation system, according to further aspects of the present disclosure.

FIG. 6 is a block diagram illustrating a caption triggered dataset generation system 600, according to further aspects of the present disclosure. The caption triggered dataset generation system 600 is similar to the caption triggered dataset generation system 400 of FIG. 4 and is described with similar reference numbers. In some aspects of the present disclosure, the caption triggered dataset generation system 600 provides an optimization of the caption triggered dataset generation system 400 of FIG. 4.

As shown in FIG. 6, the caption triggered dataset generation system 600 also includes the sentence encoder 402, the map encoder 420, and the trajectory encoder 430. The map encoder 420 and the trajectory encoder 430 also encode trajectories, map information, agent location, and the like per each driving scenario from, for example, a dataset of drive log data. The encoded map and the encoded trajectory are provided as inputs to the joint scenario encoder 440. In some aspects of the present disclosure, the joint scenario encoder 440 outputs pre-encoded scene and log representations, which are subsequently stored, as well as an associated scenario prediction loss 660 to enable scenario decoding. The output of the joint scenario encoder 440 provides a small signature of each scenario for contrasting with any possible text description (e.g., an encoded sentence) in an efficient neural encoding that involves the encoded sentence and the signature. In some aspects of the present disclosure, the pre-encoded scenario signatures provide pre-computed values for each data scenario, which are compact hash values for the scenarios, independent of the sentence query, and can be stored for an entire database.

In this example, the learned comparison block 450 receives the encoded text/sentence query and determines whether the encoded text sentence matches the stored signature of the scenarios of a dataset. In some aspects of the present disclosure, a degree to which the encoded sentence matches the signature of the encoded scenario is stored as a matching score by the learned comparison block 450. In various implementations, the system can search data (e.g., images, map information, agent location, etc.) involving a scenario description using text/sentence descriptions with increased accuracy.

In some aspects of the present disclosure, a discriminator of the caption triggered dataset generation system 600 searches for similarities between the stored, encoded scenario signatures and the encoded text/sentence query for generating a dataset of high-matching scenarios. In some aspects of the present disclosure, efficiency is improved by limiting the number of stored, encoded scenarios to a representative set, which is compared to the encoded text/ sentence query to return the set of high-matching scenarios as the query answer. The caption triggered dataset generation system 600 may engage in a process, for example, as shown in FIG. 7.

FIG. 7 is a flowchart illustrating a method for triggering capture of diverse driving scenario data from captions in a dataset of drive log data, according to further aspects of the present disclosure. A method 700 of FIG. 7 begins at block 702, in which a trajectory and a map for a selected scenario are encoded from a dataset of drive logs. At block 704, the encoded trajectory and the encoded map are provided to a joint scenario encoder to generate a pre-encoded signature for the selected scenario. At block 706, a pre-encoded signature for the selected scenario is stored. At block 708, blocks 702 to 706 are repeated for each scenario in the dataset of drive logs.

At block 710 a received text/sentence query is encoded. At block 712, a matching score is computed based on the degree to which the encoded text/sentence query matches the pre-encoded signature of a scenario, and the matching score is stored as a learned comparison for the scenario. For example, as shown in FIG. 6, a discriminator of the caption triggered dataset generation system 600 searches for similarities between the stored, encoded scenario signatures and the encoded text/sentence query for generating a dataset of high-matching scenarios. At block 714, the dataset is scanned for high matching scenarios according to the matching scores to return a dataset of the high matching scenarios as a query answer.

FIG. 8 is a process flow diagram illustrating a method for triggering capture of diverse driving scenario data from captions in a dataset of drive log data, according to aspects of the present disclosure. A method 800 begins at block 802, in which a discriminator network is trained to identify similarities between a received text description and a received scene description. For example, as shown in FIG. 3, the discriminator network training module 312 is configured to train a discriminator network to identify similarities between a received text description and a received scene description. As shown in FIG. 4, a discriminator network of the joint scenario encoder 440 is trained to accept a text description and a scene description (for example, trajectories, map information, agent location, collectively scene and log information) for identifying similarities. In some aspects of the present disclosure, over time, the discriminator network is trained to accurately predict scenario representations from text input according to a learned comparison.

At block 804, a trained discriminator network is feed with real scene information along with text/sentence descriptions to verify whether the real scene information matches the text/sentence description. For example, as shown in FIG. 3, the discriminator network verification module 314 to feed a trained discriminator network with real scene information along with text/sentence descriptions to verify whether the real scene information matches the text/sentence description. For example, the discriminator network verification module 314 may run the trained discriminator network on a dataset of vehicle driving log data to determine whether driving data from the dataset of vehicle driving log data matches a provided text/sentence description. As shown FIG. 4, the discriminator network of the joint scenario encoder 440 is fed real scene and log information along with a text/sentence description to determine whether the pairing between the text/sentence description and the scene and log description is real. In this example, the discriminator network of the joint scenario encoder 440 is gradually trained to accurately predict scenario representations or scene roll-outs from text/sentence query inputs.

At block 806, a dataset is generated to include a diverse driving scenario retrieved from a dataset of vehicle driving log data in response to a text/sentence query. For example, as shown in FIG. 3, the dataset generation module 316 to generate a dataset of diverse scenarios retrieved from a dataset of vehicle log data in response to a text/sentence query. For example, the dataset generation module 316 can search data such as images, map information, agent location, and so on, involving a scenario description from the vehicle drive log dataset 380 using text/sentences with increased accuracy. In particular, the dataset generation module 316 searches or estimates similarities in data to a text/sentence associated with a scenario for generating the diverse driving scenarios dataset 390. This example provides a small signature of each scene for contrasting with any possible text description (e.g., an encoded sentence) in an efficient neural encoding that involves the encoded sentence and the signature.

In some aspects of the present disclosure, a discriminator network is trained to accepts a text description and a scene description (e.g., trajectories, map information, agent location, etc.) for identifying similarities. A trained discriminator network is then fed real scene information along with a text/sentence description to determine whether the pairing between the text/sentence description and the scene description is real according to a learned comparison. In this example, a discriminator network is gradually trained to accurately predict scenario representations or scene rollouts from text/sentence input queries to generate a dataset of high-matching scenarios. In some aspects of the present disclosure, once trained, the trained discriminator network is run on a dataset of vehicle driving log data to determine whether a vehicle log of the dataset of vehicle driving logs matches a provided text/sentence description based on the learned comparison The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an ASIC, a field-programmable gate array signal (FPGA) or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM, flash memory, ROM, programmable read-only memory (PROM), EPROM, EEPROM, registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC with the processor, the bus interface, the user interface, supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for triggering capture of diverse driving data from captions, the method comprising:

training a discriminator network to identify similarities between a received text description and a received scene description;

feeding a trained discriminator network with real scene information along with text/sentence descriptions to form a learned comparison block when the real scene information matches a text/sentence description by:

encoding the text/sentence descriptions into word tokens, and feeding the word tokens into a map encoder and a trajectory encoder for each selected driving scenario from the real scene information to provide a respective scenario signature; and generating a dataset of diverse driving scenarios retrieved from a dataset of vehicle driving log data in response to an encoded text/sentence query and a matching scenario signature according to the learned comparison block.

2. The method of claim 1, further comprising running the trained discriminator network on the dataset of vehicle driving log data to determine whether scenarios from the dataset of vehicle driving log data are matches to the text/sentence query.

3. The method of claim 2, further comprising assigning a matching score to each scenario from the dataset of vehicle driving log data according to a degree to which the text/sentence query matches the scenario.

4. The method of claim 1, in which the discriminator network is trained to predict scenario representations from the text/sentence description.

5. The method of claim 1, in which the feeding further comprises:
   selecting a driving scenario from the dataset of vehicle driving log data;
   encoding a trajectory associated with the selected driving scenario and a map associated with the selected driving scenario;
   feeding the encoded trajectory and the encoded map to a joint scenario encoder to generate an encoded scenario signature; and
   storing the encoded scenario signature.

6. The method of claim 1, in which the generating comprises:
   assigning a matching score between the text/sentence query and each scenario in the dataset of vehicle driving log data; and
   scanning the dataset of vehicle driving log data for high-matching scenarios according to the matching score to provide the dataset of diverse driving scenarios.

7. The method of claim 1, further comprising training a planner/controller module of an autonomous vehicle according to the dataset of diverse driving scenarios.

8. A non-transitory computer-readable medium having program code recorded thereon for triggering capture of diverse driving data from captions, the program code being executed by a processor and comprising:
   program code to train a discriminator network to identify similarities between a received text description and a received scene description;
   program code to feed a trained discriminator network with real scene information along with text/sentence descriptions to form a learned comparison block when the real scene information matches a text/sentence description by:
   encoding the text/sentence descriptions into word tokens, and
   feeding the word tokens into a map encoder and a trajectory encoder for each selected driving scenario from the real scene information to provide a respective scenario signature; and
   program code to generate a dataset of diverse driving scenarios retrieved from a dataset of vehicle driving log data in response to an encoded text/sentence query and a matching scenario signature according to the learned comparison block.

9. The non-transitory computer-readable medium of claim 8, further comprising program code to run the trained discriminator network on the dataset of vehicle driving log data to determine whether scenarios from the dataset of vehicle driving log data are matches to the text/sentence query.

10. The non-transitory computer-readable medium of claim 9, further comprising program code to assign a matching score to each scenario from the dataset of vehicle driving log data according to a degree to which the text/sentence query matches the scenario.

11. The non-transitory computer-readable medium of claim 8, in which the discriminator network is trained to predict scenario representations from the text/sentence description.

12. The non-transitory computer-readable medium of claim 8, in which the program code to feed further comprises:
   program code to select a driving scenario from the dataset of vehicle driving log data;
   program code to encode a trajectory associated with the selected driving scenario and a map associated with the selected driving scenario;
   program code to feed the encoded trajectory and the encoded map to a joint scenario encoder to generate an encoded scenario signature; and
   program code to store the encoded scenario signature.

13. The non-transitory computer-readable medium of claim 8, in which the program code to generate comprises:
   program code to assign a matching score between the text/sentence query and each scenario in the dataset of vehicle driving log data; and
   program code to scan the dataset of vehicle driving log data for high-matching scenarios according to the matching score to provide the dataset of diverse driving scenarios.

14. The non-transitory computer-readable medium of claim 8, further comprising program code to train a planner/controller module of an autonomous vehicle according to the dataset of diverse driving scenarios.

15. A system for triggering capture of diverse driving data from captions, the system comprising a processor to execute:
   a discriminator network training module to train a discriminator network to identify similarities between a received text description and a received scene description;
   a discriminator network verification module to feed a trained discriminator network with real scene information along with text/sentence descriptions to form a learned comparison block when the real scene information matches a text/sentence description; by:
   encoding the text/sentence descriptions into word tokens, and
   feeding the word tokens into a map encoder and a trajectory encoder for each selected driving scenario from the real scene information to provide a respective scenario signature; and
   a dataset generation module to generate a dataset of diverse driving scenarios retrieved from a dataset of vehicle driving log data in response to an encoded text/sentence query and a matching scenario signature according to the learned comparison block.

16. The system of claim 15, in which the dataset generation module is further to run the trained discriminator network on the dataset of vehicle driving log data to determine whether scenarios from the dataset of vehicle driving log data are matches to the text/sentence query.

17. The system of claim 16, in which the trained discriminator network is further to assign a matching score to each scenario from the dataset of vehicle driving log data according to a degree to which the text/sentence query matches the scenario.

18. The system of claim 15, further comprising a planner/controller module of an autonomous vehicle trained according to the dataset of diverse driving scenarios.

* * * * *